(12) United States Patent
Grion

(10) Patent No.: US 7,489,590 B2
(45) Date of Patent: Feb. 10, 2009

(54) METHOD AND APPARATUS FOR SOURCE AND RECEIVER SIDE WAVE FIELD SEPARATION

(75) Inventor: Sergio Grion, Redhill (GB)

(73) Assignee: WesternGeco L.L.C., Houston, TX (US)

( * ) Notice: Subject to any disclaimer, the term of this patent is extended or adjusted under 35 U.S.C. 154(b) by 381 days.

(21) Appl. No.: 11/101,770

(22) Filed: Apr. 8, 2005

(65) Prior Publication Data

US 2006/0227660 A1    Oct. 12, 2006

(51) Int. Cl.
*G01V 1/38*  (2006.01)
(52) U.S. Cl. .......................... 367/24; 367/21
(58) Field of Classification Search ............ 367/21, 367/24
See application file for complete search history.

(56) References Cited

U.S. PATENT DOCUMENTS

| 4,441,174 | A | | 4/1984 | Ray et al. | |
| 4,721,180 | A | | 1/1988 | Haughland et al. | |
| 6,493,636 | B1 | * | 12/2002 | DeKok | 367/24 |
| 7,068,568 | B2 | * | 6/2006 | Robertsson | 367/24 |

FOREIGN PATENT DOCUMENTS

| EP | 1 403 662 | 3/2004 |
| GB | 1 185 063 | 3/1970 |
| GB | 1 193 507 | 6/1970 |
| GB | 2 176 605 | 12/1986 |
| GB | 2 183 834 | 6/1987 |
| GB | 2 397 884 | 8/2004 |
| GB | 2 401 179 | 11/2004 |
| WO | WO 01/75481 | 10/2001 |

OTHER PUBLICATIONS

UK Search Report dated Aug. 7, 2006 for Application No. GB 0606900.9.
Bell, D.W. and Cox, W.D., 1987, Two trace directional filtering for processing offsets VSPs, 57th SEG Annual Meeting Exp. Abstr.
Brink, M., 1987, Application of vertical receiver arrays in 3-D seismic exploration: Exp. Abstr. 49th Mtg. Europ. Ass. Expl. Geophys., Exp. Abstr.
Moldoveanu, N., 2000, Vertical source array in marine exploration, SEG Annual meeting Exp. Abstr.
Posthumus B. J., 1993, Deghosting using a twin streamer configuration:, Geophys. Prosp., 41, 267-286.
Singh, S. C., Hobbs, R. W., and Snyder, D. B. 1996, Broadband receiver response from dual-streamer data and applications in deep reflection seismology:, Geophysics, 61, 232-243.
Sonneland, L., Berg, E., Eidsvig, P., Haugen, B.F., Vestby, J., 1986, 2D deghosting using vertical receiver arrays, SEG Annual Meeting.

* cited by examiner

*Primary Examiner*—Ian J Lobo
(74) *Attorney, Agent, or Firm*—Jeffrey A. Pyle; Liangang (Mark) Ye; Jeffrey E. Griffin

(57) ABSTRACT

The present invention provides a method and apparatus for wave field separation. The method includes accessing a marine seismic data set acquired by a plurality of receivers deployed at a first plurality of depths in response to a plurality of acoustic signals provided by a plurality of seismic sources deployed at a second plurality of depths and forming at least one de-ghosted marine seismic data set based upon the plurality of seismic data sets.

22 Claims, 7 Drawing Sheets

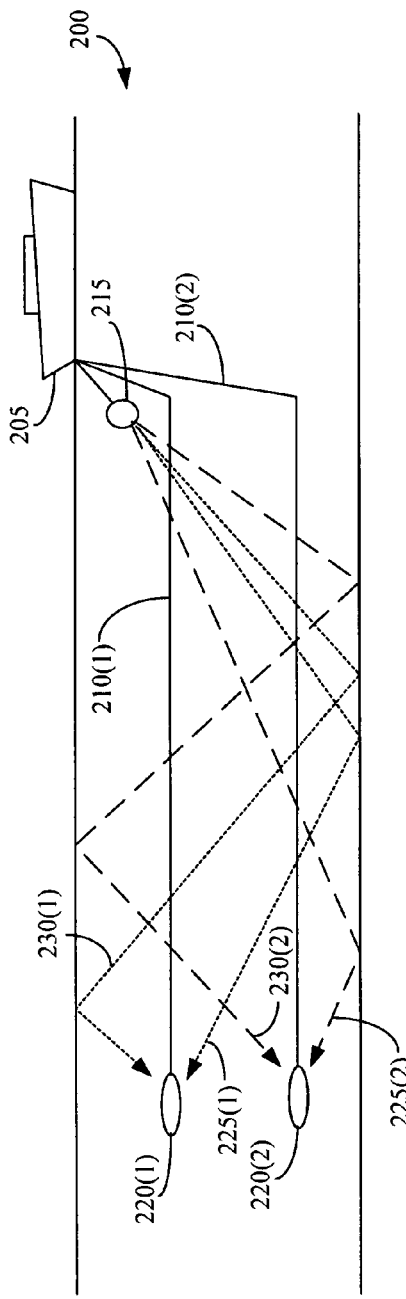
Figure 2 (PRIOR ART)
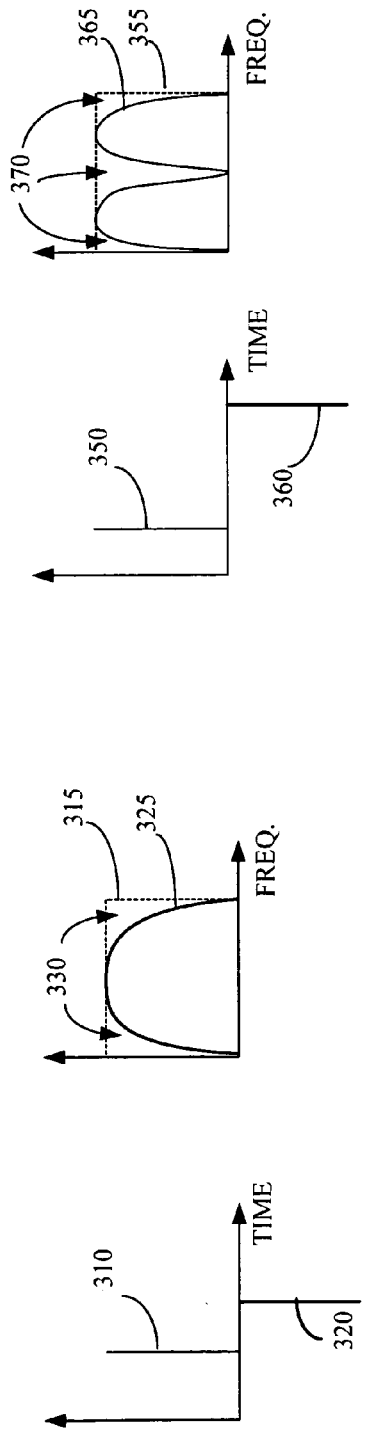
Figure 3A Figure 3B
(PRIOR ART)
Figure 3C Figure 3D
(PRIOR ART)

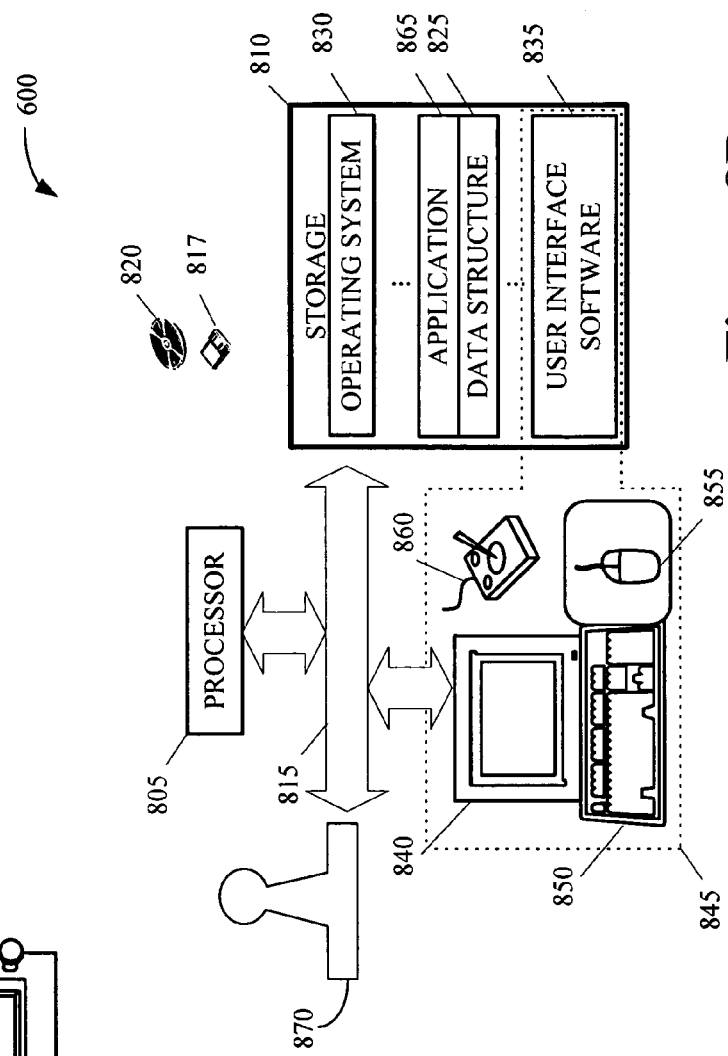
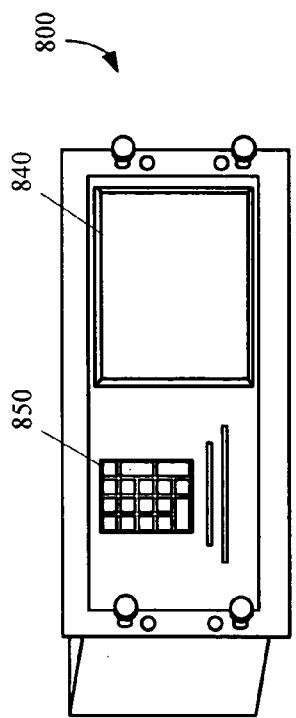
Figure 8A
Figure 8B

METHOD AND APPARATUS FOR SOURCE AND RECEIVER SIDE WAVE FIELD SEPARATION

BACKGROUND OF THE INVENTION

1. Field of the Invention

This invention relates generally to marine seismic surveying, and, more particularly, to source and receiver side wave field separation for seismic data acquired in a marine seismic survey.

2. Description of the Related Art

Seismic exploration is widely used to locate and/or survey subterranean geological formations for hydrocarbon deposits. Since many commercially valuable hydrocarbon deposits are located beneath bodies of water, various types of marine seismic surveys have been developed. In a typical marine seismic survey, such as the exemplary survey 100 conceptually illustrated in FIG. 1, marine seismic streamer 105 is towed behind a survey vessel 110. The seismic streamer 105 may be several thousand meters long and contain a large number of sensors 115, such as hydrophones and associated electronic equipment, which are distributed along the length of the each seismic streamer cable 105. The survey vessel 110 also includes one or more seismic sources 120, such as airguns and the like.

As the streamer 105 is towed behind the survey vessel 110, acoustic signals 125, commonly referred to as "shots," produced by the seismic source 120 are directed down through the water column 130 into strata 135, 140 beneath a seafloor 145, where they are reflected from the various subterranean geological formations 150. Reflected signals 155 are received by the sensors 115 in the seismic streamer cable 105, digitized, and then transmitted to the survey vessel 110. The digitized signals are referred to as "traces" and are recorded and at least partially processed by a signal processing unit 160 deployed on the survey vessel 110. The ultimate aim of this process is to build up a representation of the subterranean geological formations 150. Analysis of the representation may indicate probable locations of hydrocarbon deposits in the subterranean geological formations 150.

Seismic bandwidth may be limited by source and receiver ghosts caused by reflection of the acoustic signals 125 at the surface 165. Seismic bandwidth is the width of the amplitude spectrum, which may be defined as the frequency difference between the highest and lowest frequency at which the amplitude is above 6 dB. When the seismic bandwidth is larger, more frequencies contribute to the signal, which may increase the temporal resolution. On the source side, the effective source signature is a combination of the source signature and at least one source ghost formed when the source signature is reflected by the surface 165 before traveling to the sea floor 145. On the receiver side, the recorded pressure wave field is a combination of the up-going wave field traveling from the seafloor 145, which includes the source ghost, and a down-going wave field traveling from the surface 165 that includes the receiver ghost.

Receiver ghosts in the seismic data recorded by the receivers 115 may be at least partially removed, or de-ghosted, using a marine seismic survey that includes data collected by the streamer 105 when deployed at both a shallow depth and at a greater depth. For example, the streamer 105 may be deployed at a depth of 6 meters during a first pass over the seafloor 145 and then may be deployed at a depth of 9 meters during a second pass. Alternatively, the receivers 115 may be deployed at varying depths. This arrangement of the streamers 105 is sometimes referred to as an over/under combination of the streamers 105. The term "over" is typically associated with the shallow streamer 105 and the term "under" is typically associated with the deep streamer 105. The over/under combination technique is also known as a dual-streamer de-ghosting technique, an acoustic wave field decomposition, and the like. Moreover, the vertically-separated seismic sensors 115 may be referred to as a vertical receiver array.

FIG. 2 conceptually illustrates an alternative embodiment of a conventional system 200 that may be used to perform a marine seismic survey using an over/under combination technique. The system 200 includes a survey vessel 205, which tows a shallow streamer 210(1) and a deep streamer 210(2). The shallow and deep streamers 210(1-2) each include at least one receiver 220(1-2). A source 215 provides a seismic signal 225 that is received by receivers 220(1-2). As indicated in FIG. 2, the source 215 is typically deployed at a different depth than the receivers 220(1-2). One or more receiver ghost signals 230(1-2) are also received by the receivers 220(1-2). Thus, seismic data acquired by the receivers 220(1-2) includes contributions from at least the seismic signal 225(1-2) and the one or more receiver ghost signals 230(1-2).

FIGS. 3A-D conceptually illustrate portions of received seismic signals. In particular, FIGS. 3A and 3B conceptually illustrate a seismic signal that may be received by the shallow streamer 210(1) as a function of time (in FIG. 3A) and as a function of frequency (in FIG. 3B). As shown in FIG. 3A, the seismic signal includes an up-going wave field 310, which is approximately a delta-function corresponding to a flat amplitude spectrum seismic signal 315 in the frequency domain shown in FIG. 3B. A down-going wave field 320, corresponding to a receiver ghost signal, is depicted in FIG. 3A as an approximate delta function with a negative amplitude that arrives at a later time than the up-going wave field 310. The "over" recorded seismic data 325 acquired by the shallow streamer 210(1) is a combination of the up-going wave field 310 and the down-going wave field 320. Accordingly, the "over" recorded seismic data 325 may include one or more notches 330 that may not be present in the flat amplitude spectrum seismic signal 315.

FIGS. 3C and 3D conceptually illustrate a seismic signal that may be received by the deep streamer 210(2) as a function of time (in FIG. 3C) and as a function of frequency (in FIG. 3D). As shown in FIG. 3C, the seismic signal includes an up-going wave field 350, which is approximately a delta-function corresponding to a flat amplitude spectrum seismic signal 355 in the frequency domain shown in FIG. 3D, and a down-going wave field 360, corresponding to a receiver ghost signal, which is depicted in FIG. 3C as an approximate delta function with a negative amplitude that arrives at a later time than the up-going wave field 350. The "under" recorded seismic data 365 acquired by the source 215(2) on the deep streamer 210(2) includes one or more notches 370 that may not be present in the flat amplitude spectrum seismic signal 355.

The notches 330, 370 may result in resolution loss in the acquired seismic data. Thus, over/under combination technique attempts to estimate the up-going and down-going wave fields 310, 350 and 320, 360 by combining the "over" recorded data 325 and the "under" recorded data 365. For example, the up-going wave field 350 and a down-going wave field 360 of the deep streamer 210(2) are separated by a different time lag than the up-going wave field 310 and the down-going wave field 320 of the shallow streamer 210(1). The location of the notches 330, 370 depends on the depth of the streamers 210(1-2) and, consequently, the frequencies of the notches 370 are different than the frequencies of the notches 330. This property may be used to combine the "over" and "under" recorded data 325, 365 to reduce the effect of the notches 330, 370 in the combined data set. However, these conventional methods do not account for source ghosts.

Over-under source configurations have been used to attempt to attenuate source ghosts in ocean bottom cable data. However, these techniques rely on an approximate solution based on vertical seismic profiling (VSP) processing. Moreover, receiver side de-ghosting cannot be performed with ocean bottom cables, since these cables typically rest on the sea floor and thus cannot be deployed in an over-under configuration. Consequently, conventional methods of de-ghosting seismic data are not able account for both receiver and source ghosts, as well as the interactions between them, such as the effect of source ghosts on receiver-side seismic data.

The present invention is directed to addressing the effects of one or more of the problems set forth above.

SUMMARY OF THE INVENTION

In one embodiment of the instant invention, a method is provided for wave field separation. The method includes accessing a marine seismic data set acquired by a plurality of receivers deployed at a first plurality of depths in response to a plurality of acoustic signals provided by a plurality of seismic sources deployed at a second plurality of depths and forming at least one de-ghosted marine seismic data set based upon the plurality of seismic data sets.

BRIEF DESCRIPTION OF THE DRAWINGS

The invention may be understood by reference to the following description taken in conjunction with the accompanying drawings, in which like reference numerals identify like elements, and in which:

FIG. 2 conceptually illustrates one alternative embodiment of a conventional system that may be used to perform a marine seismic survey using an over/under combination technique;

FIGS. 3A-D conceptually illustrate received seismic signals in the conventional system of FIG. 2;

FIGS. 8A and 8B show a computing apparatus, in accordance with the present invention.

Figure 1:
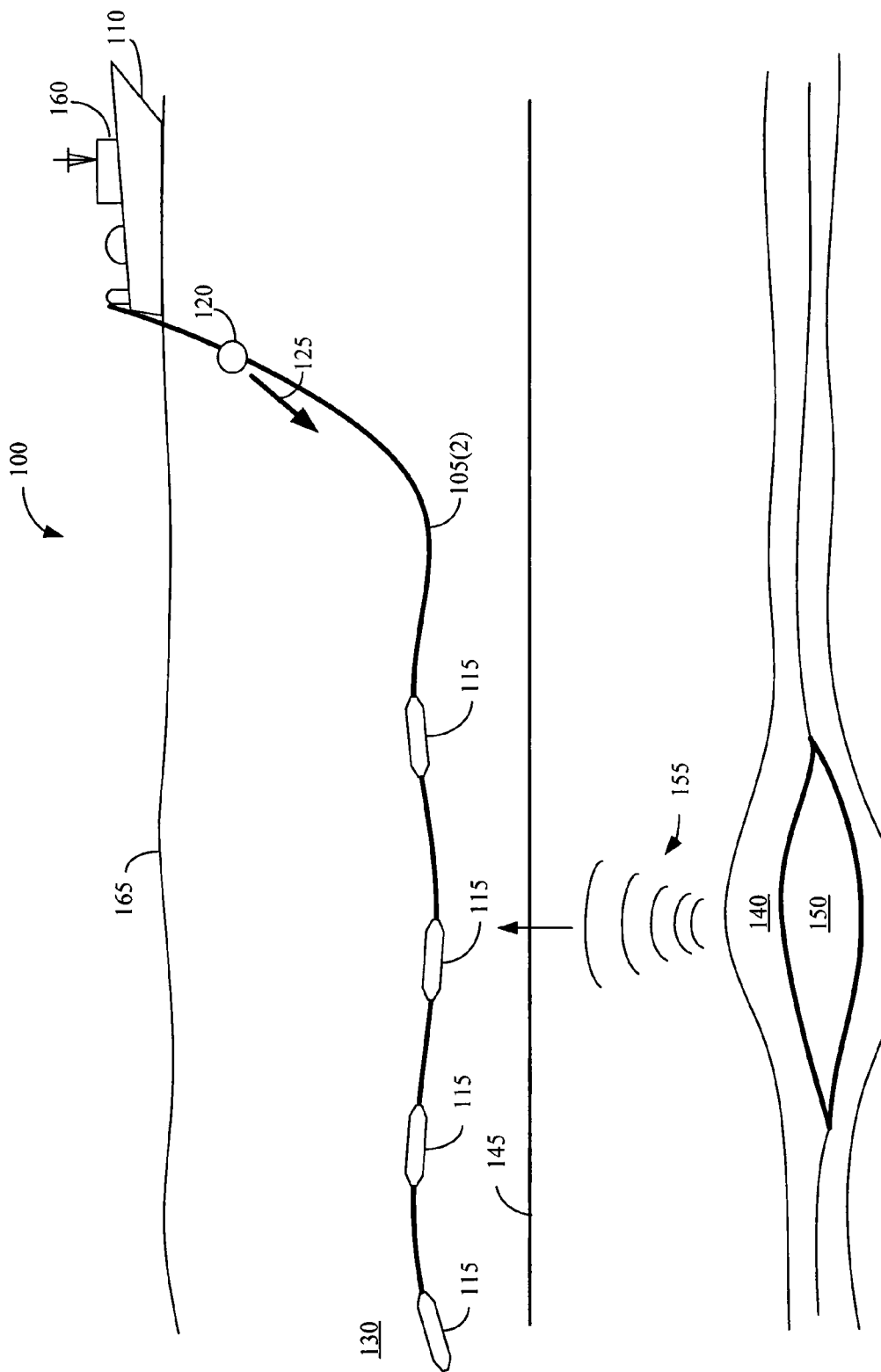
FIG. 1 shows one embodiment of a conventional marine seismic survey system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 4:
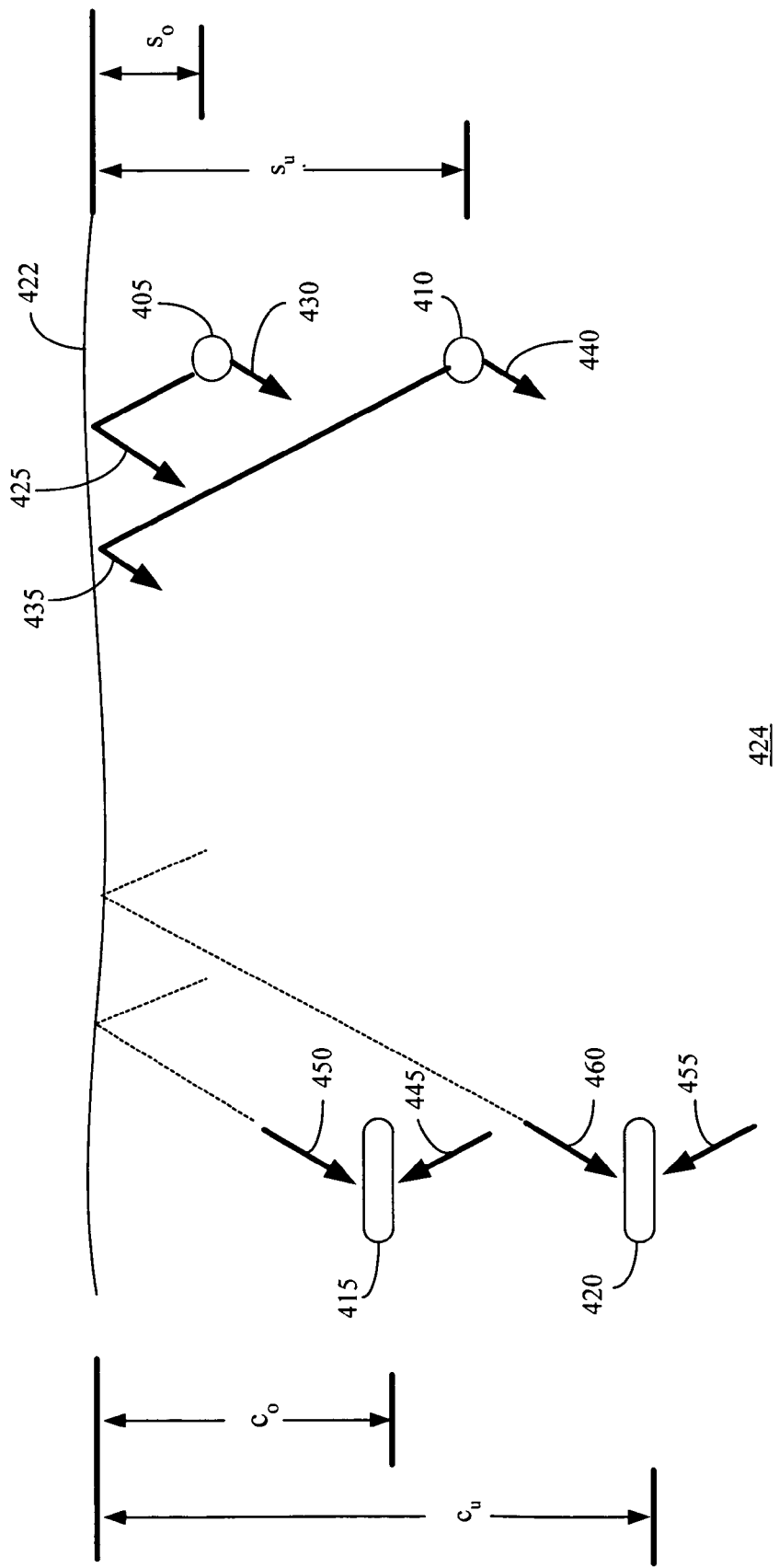
FIG. 4 conceptually illustrates up-going and down-going wave fields corresponding to a plurality of provided acoustic signals, or shots, in a marine seismic survey, in accordance with the present invention.

FIG. 4 conceptually illustrates a marine seismic survey system 400 including two sources 405, 410 and two receivers 415, 420. The sources 405, 410 and receivers 415, 420 are arranged in over/under configurations and are deployed beneath a surface 422 of a body of water 424. For the sake of clarity and so as not to obscure the present invention, the streamers along which the receivers 415, 420 and the sources 405, 410 are distributed in conventional fashion are not shown. Although only two sources 405, 410 and two receivers 415, 420 are shown in FIG. 4, persons of ordinary skill in the art should appreciate that the present invention is not limited to the illustrated configuration. In alternative embodiments, additional sources and/or receivers may be used in the marine seismic survey system 400. For example, a plurality of receivers may be distributed along over and/or under streamers (not shown).

In the illustrated embodiment, the source 405, sometimes referred to hereinafter as the "over source" 405, is deployed at depth $s_o$ and the source 410, sometimes referred to hereinafter as the "under source" 410, is deployed at a depth $s_u$. In the illustrated embodiment, the receiver 415, sometimes referred to hereinafter as the "over receiver" 415, is deployed at depth $c_o$ and the receiver 420, sometimes referred to hereinafter as the "under receiver" 420, is deployed at a depth $c_u$. Persons of ordinary skill in the art will appreciate that various factors, including water currents, wind, positioning errors, and the like may cause the sources 405, 410 and/or receivers 415, 420 to depart from their desired depths. The depths $s_o$, $s_u$, $c_o$, and $c_u$ therefore approximate some desired depth. Thus, the term "approximately," and other like terms used herein, should be understood to include the variations and/or uncertainties in the depth of one or more receivers and/or sources caused by these and other factors.

The seismic source 405 provides at least one acoustic signal that includes up-going and down-going wave fields 425, 430, respectively, and the seismic source 410 provides at least one acoustic signal that includes up-going and down-going wave fields 435, 440, respectively. The up-going wave fields 425, 435 may be referred to as source ghost signals, source ghosts, and the like, in accordance with common usage in the art. The down-going wave fields 430, 440 may be referred to as source signatures, in accordance with common usage in the art. Although the up-going and down-going wave fields 425, 430, 435, 440 are discussed herein as if they are separate entities, persons of ordinary skill in the art should appreciate that the up-going and down-going wave fields 425, 430, 435, 440 may represent portions of a single wave field produced by a single shot or portions of a plurality of wave fields produced by a plurality of shots. The wave fields 425, 430, 435, 440 associated with shots provided by the sources 405, 410 may be distinguished on the basis of the frequency range of the acoustic signal, the time at which the acoustic signal is provided, a spreading sequence used to modulate the acoustic signal, or any other desirable technique.

The over receiver 415 may detect one or more physical quantities indicative of up-going and down-going wave fields 445, 450, in response to the acoustic signals provided by the seismic source 405 and/or the seismic source 410. The up-going and down-going wave fields 445, 450 may include contributions from the down-going wave fields 430, 440, as well as contributions from the up-going wave fields 425, 435. In one embodiment, the over receiver 415 detects a pressure wave field $P(c_o)$ at the location of the over receiver 415. The under receiver 420 may detect one or more physical quantities indicative of the up-going and down-going wave fields 455, 460. In one embodiment, the under receiver 420 detects a pressure wave field $P(c_u)$ at the location of the under receiver 420. The down-going wave fields 450, 460 may be referred to as ghost signals, receiver ghost signals, receiver ghosts, and the like, in accordance with common usage in the art. As discussed above, persons of ordinary skill in the art should appreciate that the up-going and down-going wave fields 445, 450, 455, 460 may represent portions of a single wave field produced by a single shot or portions of a plurality of wave fields produced by a plurality of shots.

Seismic bandwidth may be limited by the source and/or receiver ghosts 425, 435, 450, 460. Accordingly, marine seismic data sets including information indicative of the received wave fields 445, 450, 455, 460 are accessed and used to perform source-side and receiver-side de-ghosting of the received wave fields 445, 450, 455, 460 to form a de-ghosted data set. As used herein, the term "de-ghosting" refers to processes and/or techniques that are used to reduce the effects of the source and/or receiver ghost signals 425, 435, 450, 460 on the marine seismic data. For example, de-ghosting may be used to reduce or eliminate notches in the marine seismic data set caused by the ghost signals 425, 435, 450, 460. Although de-ghosting may significantly improve the quality of the marine seismic data set, persons of ordinary skill in the art should appreciate that the degree of improvement may depend on a variety of factors including the quality of the data, weather conditions at the time the data was acquired, orientation of the sources 405, 410 and/or receivers 415, 420, and the like. De-ghosting may also be referred to as wave field separation, in accordance with common usage in the art.

Figure 5:
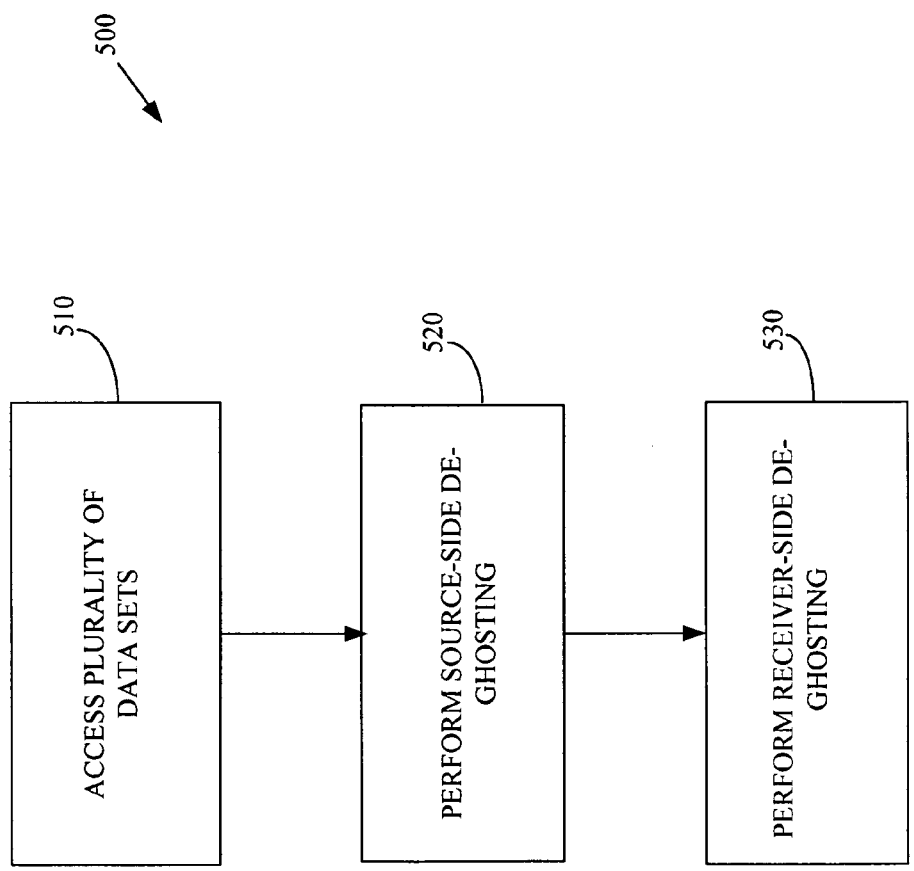
FIG. 5 conceptually illustrates one exemplary embodiment of a method of combining over/under marine seismic data to remove source and receiver side ghosts, in accordance with the present invention.

FIG. 5 conceptually illustrates one exemplary embodiment of a method 500 for performing source and receiver side de-ghosting of a marine seismic data set. A plurality of data sets is accessed (at 510). In one embodiment, a joint source and receiver over-under acquisition using at least two sources and at least two receivers, such as the sources 405, 410 and 115, 420 shown in FIG. 4, delivers four data sets $D_{lm}$ that may be accessed (at 510). The subscripts l and m referred to the source side and the receiver side, respectively, and may be set equal to o for over sources and/or receivers and equal to u for under sources and/or receivers. For example, the data set $D_{ou}$ includes data acquired by an under receiver in response to an acoustic signal provided by an over source. In one embodiment, the four data sets $D_{lm}$ may be stored in a memory of a survey vessel or at any other desirable location and then accessed (at 510) from the memory. Persons of ordinary skill in the art should appreciate that the plurality of data sets may be incorporated into a single data structure and/or stored on a single device. For example, an appropriately indexed data structure may be used to store a superset including the plurality of data sets.

A source-side de-ghosting is performed (at 520) and a receiver-side de-ghosting is performed (at 530). In alternative embodiments, the source and receiver side de-ghosting may be performed (at 520, 530) as separate steps or as a single combined step, as will be discussed in detail below. When executed in separate steps, they may be performed either in series or in parallel. The recorded data sets $D_{lm}$ may be related to the de-ghosted wave fields using a forward modeling operator, $F_{lm}$. The forward modeling operator, $F_{lm}$, may also be referred to as a ghosting operator. For example, the de-ghosted wave field $U(s_o,c_o)$ propagating from an over source at depth $s_o$ to an over cable (not shown) at depth $c_o$ may be related to the recorded data sets using the formula:

$$D_{lm}=F_{lm}U(s_o,c_o) \qquad \text{Eq. (1)}$$

where the forward modeling operator, $F_{lm}$, is given by the equation:

$$F_{lm}=e^{jk_{zr}(c_m-c_o)}e^{jk_{zs}(s_l-s_o)}(1-r_w e^{-j2k_{zr}c_m})(1-r_w e^{-j2k_{zs}s_l}) \qquad \text{Eq. (2)}$$

In equation (2), $c_m$ is the cable depth and $s_l$ is the source depth for the considered over/under source/receiver pair, and $r_w$ is a sea-surface reflection coefficient. The vertical source and receiver side wave numbers $k_{zs}$ and $k_{zr}$, respectively, may be determined using the equations:

$$k_{zs}=\sqrt{\frac{\omega^2}{v^2}-k_{xs}^2-k_{ys}^2} \qquad \text{Eq. (3)}$$

and $$k_{zr}=\sqrt{\frac{\omega^2}{v^2}-k_{xr}^2-k_{yr}^2} \qquad \text{Eq. (4)}$$

where v is a water velocity, $\omega$ is an angular frequency, and $k_{xr}$, $k_{yr}$, $k_{xs}$, and $k_{ys}$ are the horizontal wave numbers associated with the source and receiver, respectively. In one embodiment, a two-dimensional approximation may be adopted in which the cross-line wave numbers $k_{yr}$ and $k_{ys}$ are neglected. Unless otherwise stated, the remaining discussion of method 500 will assume the two-dimensional approximation. However, persons of ordinary skill in the art should appreciate that the present invention is not limited to the two-dimensional approximation.

Eq. (1) may be considered an over-determined system having four equations, e.g. the relations between the recorded data sets $D_{lm}$, the operators $F_{lm}$, and the de-ghosted wave field $U(s_o,c_o)$, for determining a single unknown quantity, e.g. the de-ghosted wave field $U(s_o,c_o)$. In one embodiment, equation 1 is solved analytically in a least-square sense to generate the solution:

$$U(s_o,c_o)=\frac{\sum_{l,m}F_{lm}^*D_{lm}}{|F_{lm}|^2} \qquad \text{Eq. (5)}$$

In the illustrated embodiment, equation 5 represents a weighted sum in the f–k domain of the recorded data sets $D_{lm}$. The weights may be determined by the relative amplitude of the ghosting operators $F_{lm}$. In one embodiment, the survey may be designed so that source and receiver ghost notches do not overlap, in which case Eq. (5) may eliminate all source and/or receiver ghost notches apart from the source and/or receiver ghost notches found at zero frequency, which are nearly always present in recorded marine seismic data.

The solution indicated by Eq. (5) assumes a calm sea surface. However, the present invention is not limited to a calm sea surface. In alternative embodiments, an equivalent solution, e.g. a rough sea solution, may be derived independent of sea surface conditions. In one embodiment, the equivalent solution may be derived as an extension of receiver side de-ghosting and may include singularities corresponding to recorded marine seismic data having a source at a depth $\Delta s$ and a receiver cable at a depth $\Delta c$, where $\Delta s$ and $\Delta c$ are the depth differences between over-under sources and receivers.

In one alternative embodiment, a one-dimensional earth model may be used in the de-ghosting process. In this embodiment, the source and receiver side wave numbers are assumed to be equal ($k_{zs}=k_{zr}$). Accordingly, Eq. (5) may be applied after an ($\omega-k_x$) transformation in the common shot domain. However, in general, source and/or receiver side wave numbers may differ and a two-dimensional application of Eq. (5) may be used. In that case, a three-dimensional Fourier transform to $\omega-k_{xr}-k_{xs}$ may be utilized.

In another alternative embodiment, which may be practiced in addition to or in place of the previously discussed embodiments, Eq. (5) may be implemented by decoupling the source and receiver de-ghosting into two steps. In the first step, a common receiver gather is formed and then source side de-ghosting is performed on the marine seismic data sets. In the second step, one or more common shot gathers are formed and receiver side de-ghosting is performed on the marine seismic data sets. Persons of ordinary skill in the art should appreciate that the two steps may be implemented in any desirable order or in parallel. The two-step approach may incur a greater computational cost, but it is otherwise substantially equivalent to the one-step implementation. The two-step implementation may have the advantage of being applicable using existing receiver side de-ghosting techniques.

Figure 6:
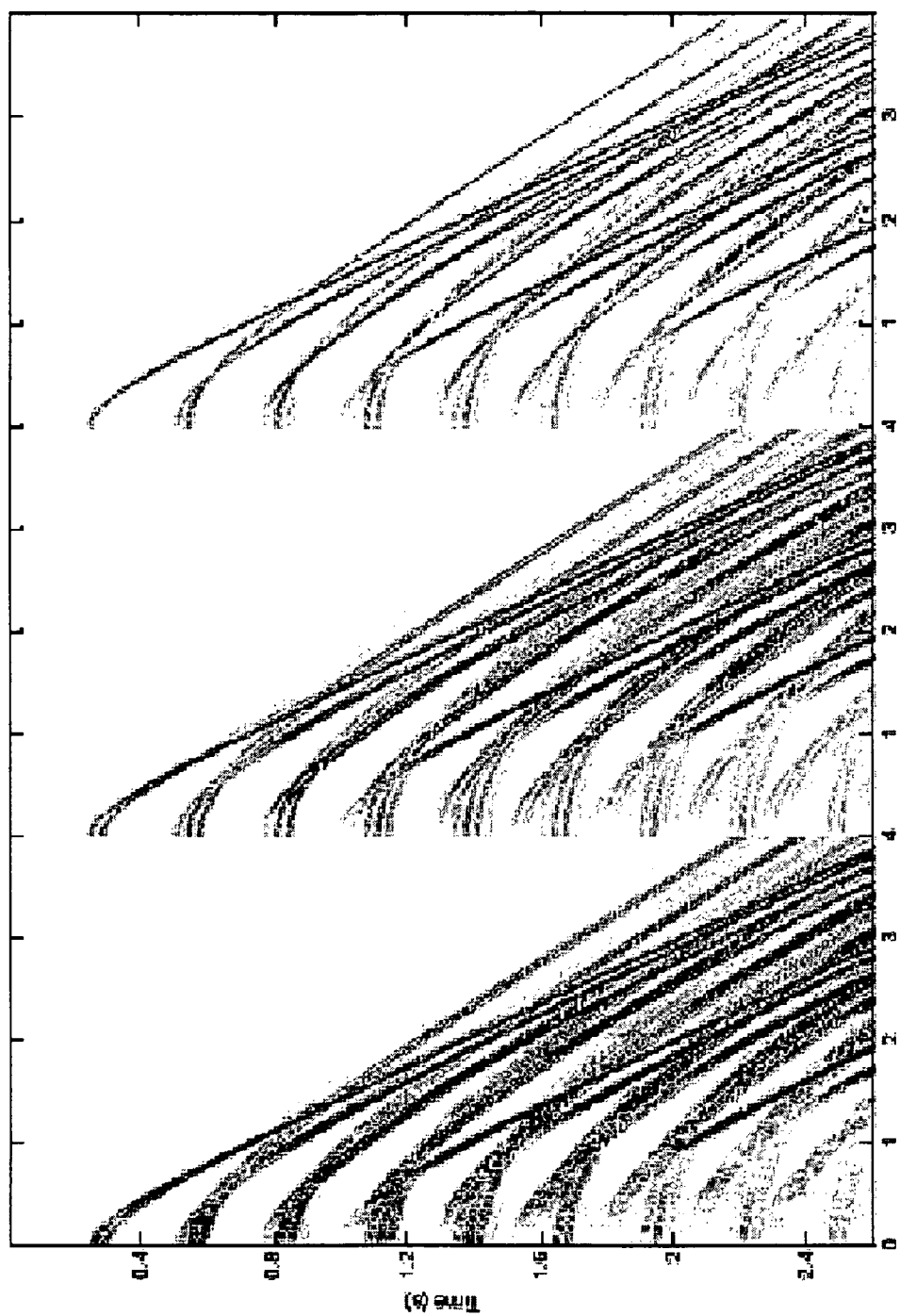
FIGS. 6A, 6B, and 6C show the effects of source and receiver side de-ghosting on a synthetic marine seismic data set, in accordance with the present invention.

FIGS. 6A, 6B, and 6C show the effects of source and receiver side de-ghosting in accordance with the present invention on a synthetic marine seismic data set. The vertical axis in FIG. 6 represents time in seconds and the horizontal axis represents offset in kilometers. The synthetic marine seismic data set used to generate FIGS. 6A-C assumes a source at a depth of 11 meters and a receiver cable at a depth of 25.2 meters. The raw marine seismic data is presented in the leftmost panel (FIG. 6A). The center panel (FIG. 6B) shows the marine seismic data after source de-ghosting and the right hand panel (FIG. 6C) shows the marine seismic data after both the source and receiver side de-ghosting. The resolution of the marine seismic data after both source and receiver side de-ghosting is significantly improved over the resolution of the raw marine seismic data and the marine seismic data after only source de-ghosting.

Figure 7:
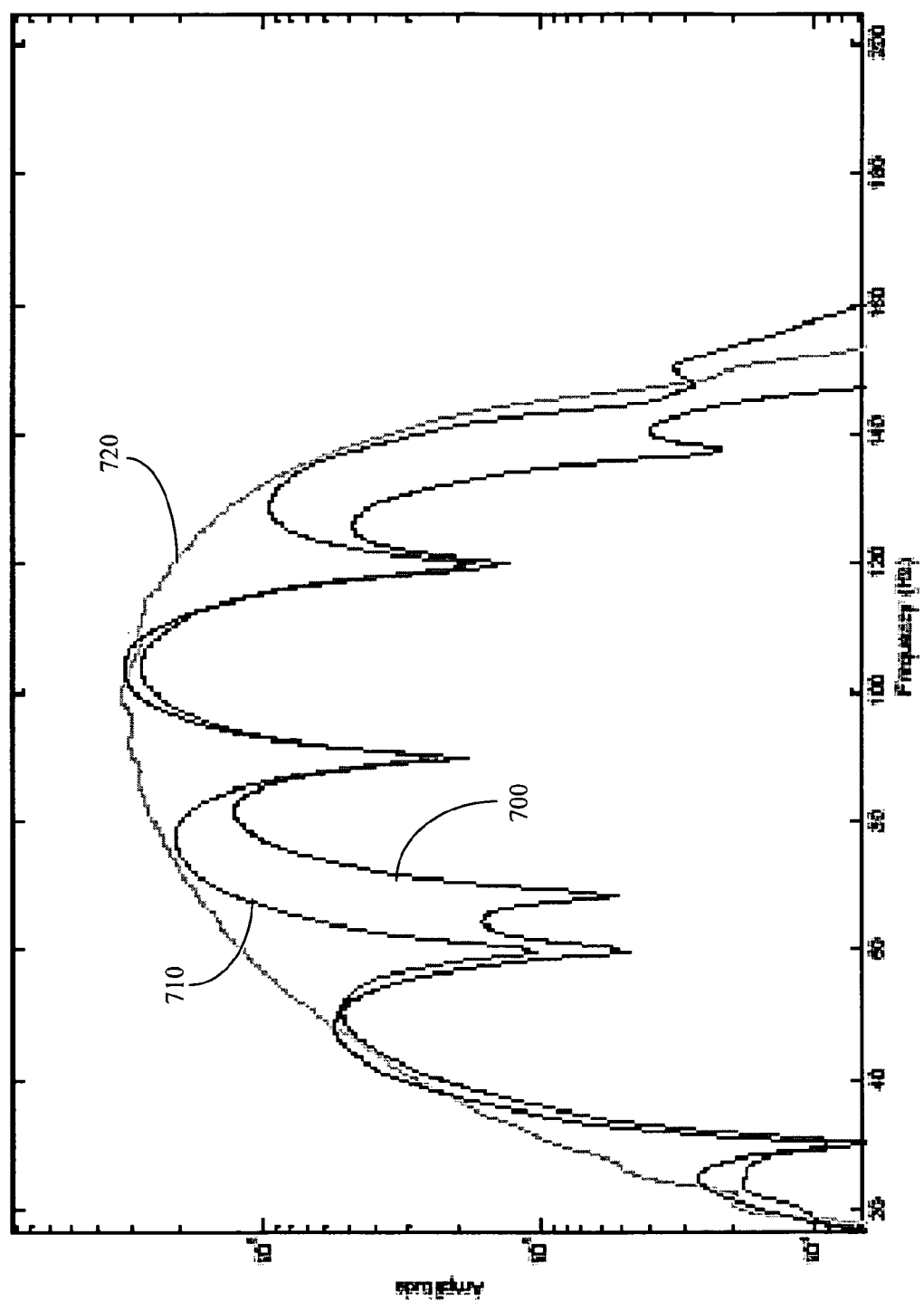
FIG. 7 shows amplitude spectra for an input marine seismic data set, a marine seismic data set after source de-ghosting, and a marine seismic data set after joint source-receiver de-ghosting, in accordance with the present invention.

FIG. 7 shows amplitude spectra for an input marine seismic data set 700, a marine seismic data set after source de-ghosting 710, and a marine seismic data set after joint source-receiver de-ghosting 720. The vertical axis represents amplitude in arbitrary units and the horizontal axis represents frequency in Hertz. The amplitude spectra 700, 710, 720 shown in FIG. 7 are for a sea bottom reflection at an offset of approximately 50 meters. Numerous notches caused by source and/or receiver ghosts are present in the input marine seismic data 700, as well as the marine seismic data after only source de-ghosting 710. However, joint source-receiver de-ghosting has significantly reduced the amplitude of the notches in the de-ghosted the marine seismic data 720.

FIGS. 8A and 8B show a computing apparatus 800 that may be used to perform the aforementioned operations. The computing apparatus 800 includes a processor 805 communicating with some storage 810 over a bus system 815. The storage 810 may include a hard disk and/or random access memory ("RAM") and/or removable storage such as a floppy magnetic disk 817 and an optical disk 820. The storage 810 is encoded with a data structure 825 storing the signals collected as discussed above, an operating system 830, user interface software 835, and an application 865. The user interface software 835, in conjunction with a display 840, implements a user interface 845. The user interface 845 may include peripheral I/O devices such as a key pad or keyboard 850, a mouse 855, or a joystick 860. The processor 805 runs under the control of the operating system 830, which may be practically any operating system known to the art. The application 865 is invoked by the operating system 830 upon power up, reset, or both, depending on the implementation of the operating system 830.

As discussed above, data collected during the marine seismic survey may be communicated to the computing apparatus 800 via any storage medium, including, but not limited to, recording tape, magnetic disks, compact disks, and DVDs. The data collected during the marine seismic survey may also be communicated directly to the computing apparatus 800 by, e.g., a satellite link 870, and stored in the storage 810. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   accessing marine seismic data set acquired by a plurality of receivers deployed at a first plurality of depths in response to a plurality of acoustic signals provided by a plurality of seismic sources deployed at a second plurality of depths; and
   forming at least one common receiver gather;
   performing at least one source-side de-ghosting on said at least one common receiver gather;
   forming at least one common shot gather;
   performing at least one receiver-side de-ghosting on said at least one common shot gather; and
   forming at least one de-ghosted marine seismic data set based upon the de-ghosted common receive gather and the de-ghosted common shot gather.

2. The method of claim 1, wherein accessing the marine seismic data set comprises:
   accessing a first marine seismic data set acquired by at least one first receiver deployed at a first depth in response to at least one first acoustic signal generated by at least one first seismic source deployed at a first source depth;
   accessing a second marine seismic data set acquired by said at least one first receiver deployed at the first receiver depth in response to at least one second acoustic signal provided by at least one second seismic source deployed at a second source depth;
   accessing a third marine seismic data set acquired by at least one second receiver deployed at a second receiver depth in response to said at least one first acoustic signal provided by said at least one first seismic source deployed at the first source depth; and
   accessing a fourth marine seismic data set acquired by said at least one second receiver deployed at the second receiver depth in response to said at least one second acoustic signal provided by said at least one second seismic source deployed at the second source depth.

3. The method of claim 1, wherein forming said at least one de-ghosted marine seismic data set comprises forming said at least one de-ghosted marine seismic data set under a two-dimensional approximation in which cross-line wave numbers are neglected.

4. The method of claim 1, wherein forming said at least one de-ghosted marine seismic data set comprises forming said at least one de-ghosted marine seismic data set based on a least-squares solution.

5. The method of claim 1, wherein the marine seismic data set is acquired under calm sea conditions.

6. The method of claim 1, wherein the marine seismic data set is acquired under rough sea conditions.

7. The method of claim 1, wherein the source-side de-ghosting, the receiver-side de-ghosting, or both the source-side and the receiver-side de-ghosting applies a one dimensional earth model.

8. The method of claim 1, wherein the source-side de-ghosting, the receiver-side de-ghosting, or both the source-side and the receiver-side de-ghosting applies a multi-dimensional earth model.

9. An article comprising one or more machine-readable storage media containing instructions that when executed enable a computer to:
   access a marine seismic data set acquired by a plurality of receivers deployed at a first plurality of depths in response to a plurality of acoustic signals provided by a plurality of seismic sources deployed at a second plurality of depths; and
   forming at least one common receiver gather;
   performing at least one source-side de-ghosting on said at least one common receiver gather;
   forming at least one common shot gather;
   performing at least one receiver-side de-ghosting on said at least one common shot gather; and
   forming at least one de-ghosted marine seismic data set based upon the de-ghosted common receive gather and the de-ghosted common shot gather.

10. The article of claim 9, wherein said one or more machine-readable storage media contain instructions that when executed enable the computer to:
    access a first marine seismic data set acquired by at least one first receiver deployed at a first depth in response to at least one first acoustic signal provided by at least one first seismic source deployed at a first source depth;
    access a second marine seismic data set acquired by said at least one first receiver deployed at the first receiver depth in response to at least one second acoustic signal provided by at least one second seismic source deployed at a second source depth;
    access a third marine seismic data set acquired by at least one second receiver deployed at a second receiver depth in response to said at least one first acoustic signal provided by said at least one first seismic source deployed at the first source depth; and
    access a fourth marine seismic data set acquired by said at least one second receiver deployed at the second receiver depth in response to said at least one second acoustic signal provided by said at least one second seismic source deployed at the second source depth.

11. The article of claim 9, wherein said one or more machine-readable storage media contain instructions that when executed enable the computer to form said at least one de-ghosted marine seismic data set based on a least-squares solution.

12. The article of claim 9, wherein the marine seismic data set is acquired under calm sea conditions.

13. The article of claim 9, wherein the marine seismic data set is acquired under rough sea conditions.

14. The article of claim 9, wherein the source-side de-ghosting, the receiver-side de-ghosting, or both the source-side and the receiver-side de-ghosting applies a one dimensional earth model.

15. The article of claim 9, wherein the source-side de-ghosting, the receiver-side de-ghosting, or both the source-side and the receiver-side de-ghosting applies a multi-dimensional earth model.

16. An article comprising one or more machine-readable storage media containing data structures and data formed by:
    accessing a plurality of marine seismic data sets acquired by a plurality of receivers deployed at a first plurality of depths in response to a plurality of acoustic signals provided by a plurality of seismic sources deployed at a second plurality of depths; and
    forming at least one common receiver gather;
    performing at least one source-side de-ghosting on said at least one common receiver gather;
    forming at least one common shot gather;

performing at least one receiver-side de-ghosting on said at least one common shot gather; and forming at least one de-ghosted marine seismic data set based upon the de-ghosted common receive gather and the de-ghosted common shot gather.

17. The article of claim 16, comprising one or more machine-readable storage media containing data structures and data formed by:

accessing a first marine seismic data set acquired by at least one first receiver deployed at a first depth in response to at least one first acoustic signal provided by at least one first seismic source deployed at a first source depth;

accessing a second marine seismic data set acquired by said at least one first receiver deployed at the first receiver depth in response to at least one second acoustic signal provided by at least one second seismic source deployed at a second source depth;

accessing a third marine seismic data set acquired by at least one second receiver deployed at a second receiver depth in response to said at least one first acoustic signal provided by said at least one first seismic source deployed at the first source depth; and accessing a fourth marine seismic data set acquired by said at least one second receiver deployed at the second receiver depth in response to said at least one second acoustic signal provided by said at least one second seismic source deployed at the second source depth.

18. The article of claim 16, comprising one or more machine-readable storage media containing data structures and data formed by forming said at least one de-ghosted marine seismic data set based on a least-squares solution.

19. The article of claim 16, wherein the marine seismic data set is acquired under calm sea conditions.

20. The article of claim 16, wherein the marine seismic data set is acquired under rough sea conditions.

21. The article of claim 16, wherein the source-side de-ghosting, the receiver-side de-ghosting, or both the source-side and the receiver-side de-ghosting applies a one dimensional earth model.

22. The article of claim 16, wherein the source-side de-ghosting, the receiver-side de-ghosting, or both the source-side and the receiver-side de-ghosting applies a multi-dimensional earth model.

* * * * *